US012661967B2

(12) United States Patent (10) Patent No.: US 12,661,967 B2
Sekiuchi (45) Date of Patent: Jun. 23, 2026

(54) RESTRICTION RELEASING APPARATUS

(71) Applicant: Isuzu Motors Limited, Yokohama (JP)

(72) Inventor: Takahiro Sekiuchi, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 283 days.

(21) Appl. No.: 18/427,893

(22) Filed: Jan. 31, 2024

(65) Prior Publication Data

US 2024/0253444 A1 Aug. 1, 2024

(30) Foreign Application Priority Data

Feb. 1, 2023 (JP) .................................. 2023-014059

(51) Int. Cl.
*B60K 1/04* (2019.01)
*H01M 50/262* (2021.01)
(52) U.S. Cl.
CPC ............. *B60K 1/04* (2013.01); *H01M 50/262* (2021.01); *H01M 2220/20* (2013.01)
(58) Field of Classification Search
CPC .......... B60L 53/80; B60L 50/66; B60L 50/64; H01M 50/264; H01M 50/262; H01M 2220/20; H01M 50/202; B60K 1/04; B60K 2001/0494; B60K 2001/0438; B60K 2001/0472; B60K 2001/0461; B60K 2001/0444
See application file for complete search history.

(56) References Cited

U.S. PATENT DOCUMENTS

| | | | |
|---|---|---|---|
| 2019/0263269 A1* | 8/2019 | Huff | ......................... B60K 1/04 |
| 2023/0191939 A1* | 6/2023 | Zhang | ................. H01M 50/262 |
| | | | 180/68.5 |
| 2024/0030541 A1* | 1/2024 | Zhang | ................. H01M 50/262 |
| 2024/0234908 A1* | 7/2024 | Zhang | ................. H01M 50/249 |

FOREIGN PATENT DOCUMENTS

| | | |
|---|---|---|
| JP | 63-070661 | 5/1988 |
| JP | 03-109268 | 11/1991 |
| JP | 2002-362261 | 12/2002 |

* cited by examiner

*Primary Examiner* — Timothy Hannon

(57) ABSTRACT

A restriction releasing apparatus is a restriction releasing apparatus that releases restriction imposed by a restriction apparatus that restricts movement of a battery from an inner position in a vehicle to an outer position, and includes a support portion movable toward a restriction position and a release section supported by the support portion, in which the release section rotates the rotation section from the restriction position to a non-restriction position.

4 Claims, 11 Drawing Sheets

RESTRICTION RELEASING APPARATUS

RELATED APPLICATIONS

This application claims the benefit of Japanese Patent Application No. 2023-014059 filed on Feb. 1, 2023, the contents of which are incorporated by reference as if fully set forth herein in their entirety.

TECHNICAL FIELD

The present disclosure relates to a restriction releasing apparatus.

BACKGROUND ART

Conventionally, in a vehicle including a battery, such as an electric vehicle or a hybrid vehicle, the battery is fixed to a vehicle body inside the vehicle. For example, Patent Literature (hereinafter, referred to as "PTL") 1 discloses a configuration including a main lock apparatus and a fail-safe lock apparatus for preventing a battery from falling due to an unlocked state of the main lock apparatus caused by a malfunction or the like.

CITATION LIST

Patent Literature

PTL 1
Japanese Patent Application Laid-Open No. 2002-362261

SUMMARY OF INVENTION

Technical Problem

Meanwhile, some vehicles have a configuration in which a battery can be pulled out of and housed in the vehicles between the inside and the outside of the vehicles via a slide portion, but in this configuration, there is a possibility that the battery is pulled out at a timing unintended by an operator due to an inclined state during when the vehicle is parked. Therefore, it is preferable to provide a restriction mechanism that restricts the battery from being pulled out. However, in a case where restriction by a restriction apparatus is released by manual operation by an operator, there might be an increase in burden on the operator, and therefore, it is desired that the restriction can be easily released.

An object of the present disclosure is to provide a restriction releasing apparatus capable of easily releasing the restriction imposed by a restriction apparatus.

Solution to Problem

A restriction releasing apparatus according to the present disclosure is a restriction releasing apparatus that releases restriction imposed by a restriction apparatus that restricts movement of a battery from an inner position in a vehicle to an outer position by using a rotation section that rotates between a restriction position and a non-restriction position, the restriction releasing apparatus including:

a support portion movable toward the restriction position; and a release section supported by the support portion, in which the release section rotates the rotation section from the restriction position to the non-restriction position.

Advantageous Effects of Invention

According to the present disclosure, it is possible to easily release restriction imposed by a restriction apparatus.

DESCRIPTION OF EMBODIMENTS

Figure 1:
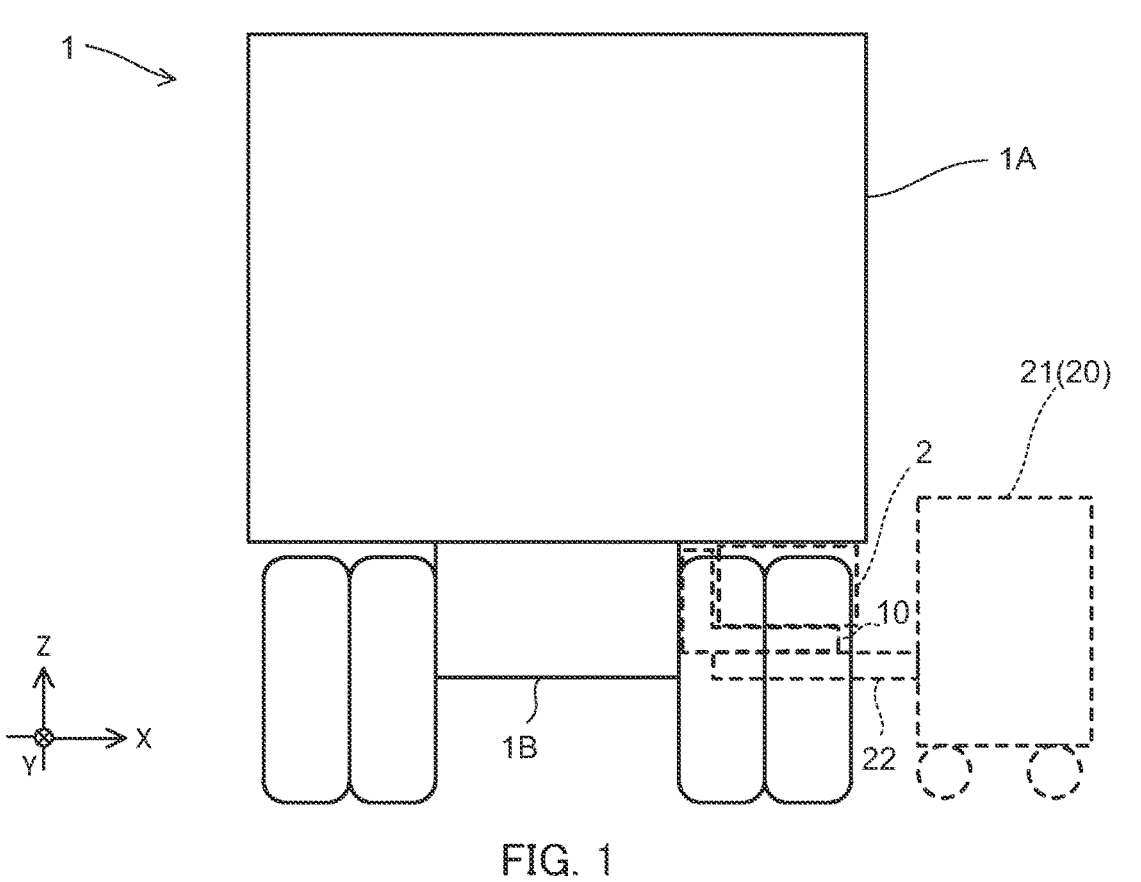
FIG. 1 is a view illustrating a vehicle including an attachment apparatus to which a restriction releasing apparatus according to an embodiment of the present disclosure is applied.

Hereinafter, embodiments of the present disclosure will be described in detail based on the drawings. FIG. 1 is a diagram illustrating a vehicle including an attachment apparatus to which a restriction releasing apparatus according to an embodiment of the present disclosure is applied.

In describing the configuration of the restriction apparatus of the present embodiment, an orthogonal coordinate system (X, Y, Z) is used. The same orthogonal coordinate system (X, Y, Z) is also used for illustration of below-mentioned figures. The X-direction indicates the left-right direction of vehicle 1 on which the restriction apparatus is mounted, the Y-direction indicates the front-rear direction of vehicle 1, and the Z-direction indicates the up-down direction of vehicle 1.

As illustrated in FIG. 1, vehicle 1 is such a vehicle as an electric vehicle or a hybrid vehicle which can travel by battery 2. Vehicle 1 is also a large vehicle such as a truck, and is equipped with loading platform 1A. In addition, attachment apparatus 10 for attachment of battery 2 is disposed on vehicle body 1B of vehicle 1 on which loading platform 1A is mounted.

Battery 2 is fixed at an inner position of vehicle 1 by attachment apparatus 10 while being restricted from moving to an outer position of vehicle 1. When battery 2 is replaced, restriction releasing apparatus 20 for releasing the restriction on the movement of battery 2 is used.

In the following description, the configuration of attachment apparatus 10 to which restriction releasing apparatus 20 is applied will be first described before the detailed description of restriction releasing apparatus 20 according to the present embodiment.

Figure 2:
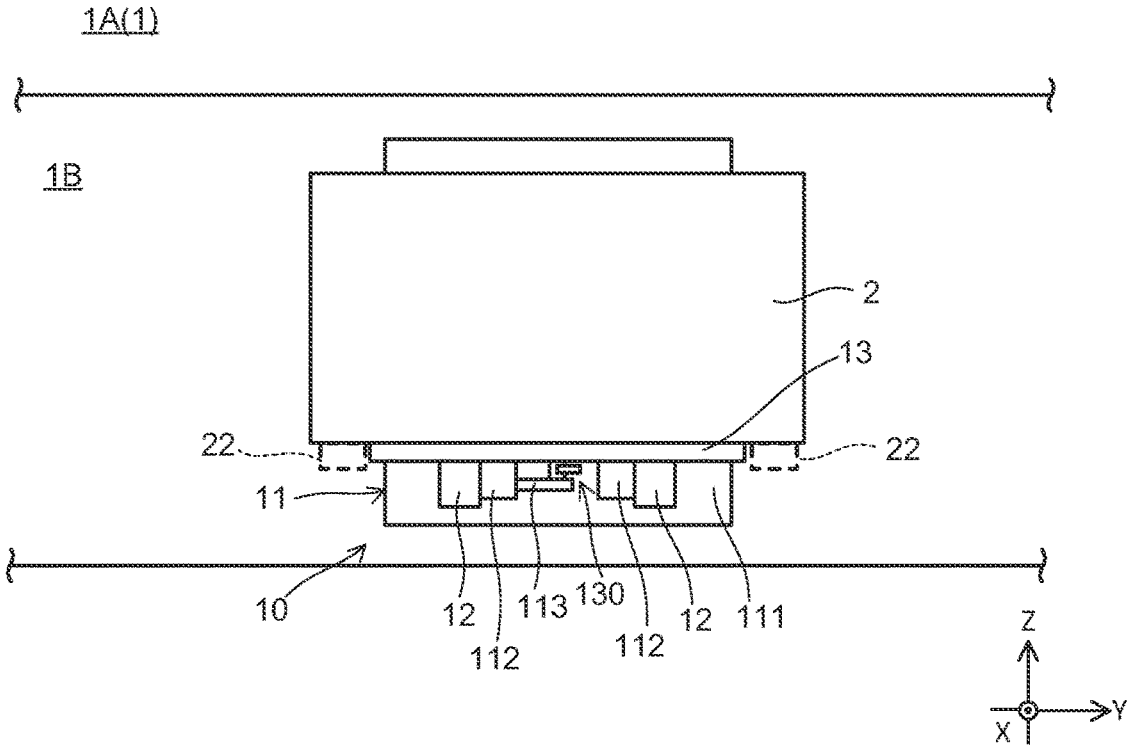
FIG. 2 is a view of the attachment apparatus viewed in the X-direction.

As illustrated in FIG. 2, attachment apparatus 10 includes main body portion 11, slide portion 12, and placement portion 13.

Main body portion 11 is disposed at a position corresponding to the lower side (the − side in the Z-direction) of loading platform 1A, and includes wall portion 111 and support portions 112.

Wall portion 111 is a wall disposed along the Z-direction, and is fixed to, for example, a side surface (the + side in the X-direction) of vehicle body 1B. Wall portion 111 is provided with latch 111A that is engaged with striker 2A disposed on the side surface of battery 2 (see FIG. 3B). When latch 111A and striker 2A are engaged with each other, battery 2 is fixed to vehicle 1.

Support portions 112 are members extending toward the + side in the X-direction from the end portion of wall portion 111 on the − side in the Z-direction, and two support portions are disposed alongside with each other in the Y-direction. Support portions 112 are disposed to support placement portion 13 and battery 2 from the − side in the Z-direction when battery 2 is fixed to vehicle 1.

Further, support portions 112 are provided with restriction member 113 for restricting the movement of battery 2 from the inner position (the position illustrated in FIG. 3A) to the outer position (the position illustrated in FIG. 3B) of vehicle 1.

For example, restriction member 113 is configured to extend to the + side in the Y-direction from one of two support portions 112 which is positioned on the − side in the Y-direction. Note that restriction member 113 does not have to be disposed on support portion 112, and may be disposed at any location on vehicle body 1B, for example.

Restriction member 113 is disposed on an end portion of support portion 112 on the + side in the X-direction, and is positioned on the + side in the X-direction with respect to below-described rotation section 130 when battery 2 is positioned at the inner position of vehicle 1.

Slide portions 12 are a telescopic slide rail for moving battery 2 between the inner position in vehicle 1 and the outer position. Slide portions 12 are fixed respectively to support portions 112, for example.

Figure 3A:
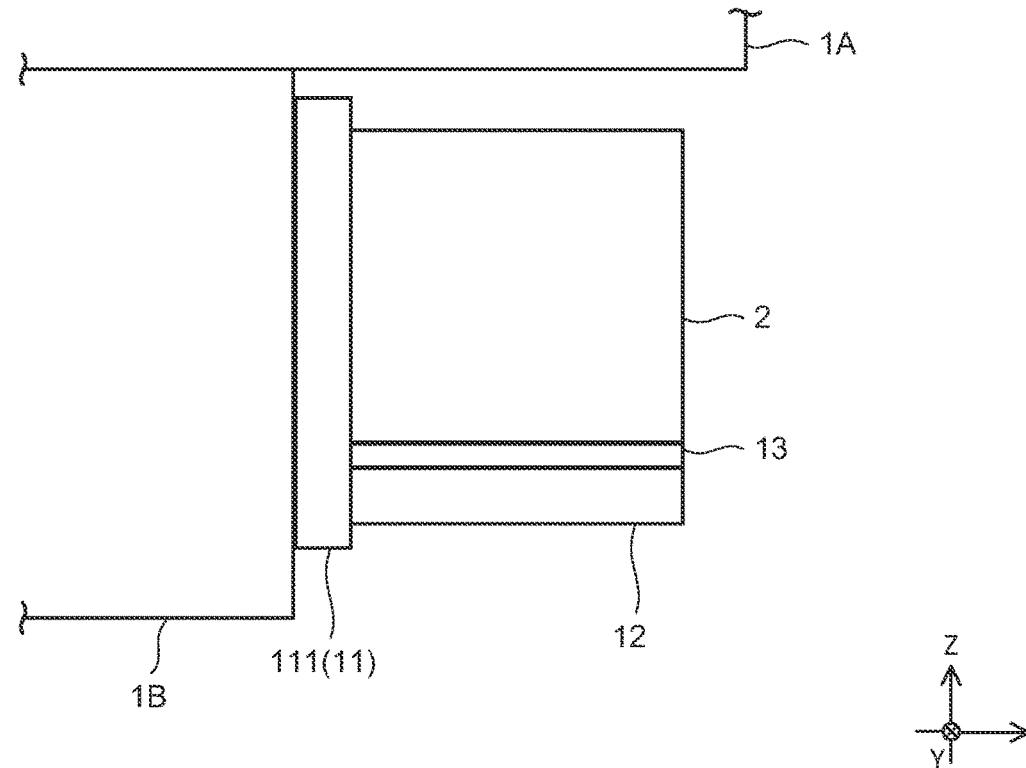
FIG. 3A is a diagram for explaining movement of a battery between an inner position and an outer position.

As illustrated in FIG. 3A, slide portions 12 are located in the inner range of vehicle 1 in the X-direction when being in the most retracted state. The above-described inner position is a position where battery 2 is not positioned outside vehicle 1 in the X-direction, and may be, for example, a position of battery 2 (placement portion 13) when slide portions 12 are in the most retracted state.

Figure 3B:
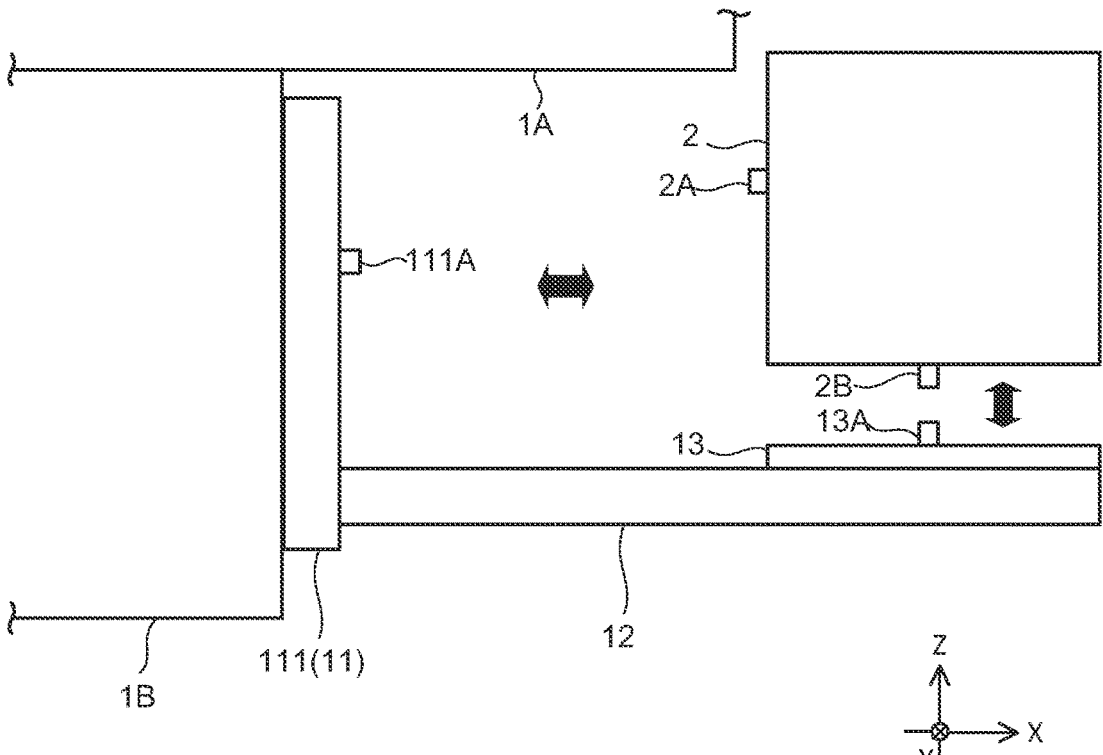
FIG. 3B is a diagram for explaining the movement of the battery between the inner position and the outer position.

As illustrated in FIG. 3B, when slide portions 12 are in the most extended position, the distal end portions are located on the + side in the X-direction with respect to loading platform 1A, that is, in a range outside vehicle 1. The above-described outer position is a position outside vehicle 1 in the X-direction at which battery 2 is detachable from placement portion 13, and may be, for example, a position of battery 2 (placement portion 13) in a state where slide portions 12 are most extended.

Placement portion 13 is a portion on which battery 2 is placed, and is attached to slide portions 12. Latch 13A to be engaged with striker 2B disposed on a bottom surface of battery 2 is disposed on a surface of placement portion 13 on the + side in the Z-direction. When latch 13A and striker 2B are engaged with each other, battery 2 is fixed to placement portion 13.

Further, when latch 13A and striker 2B are disengaged from each other when placement portion 13 is positioned in the range outside vehicle 1, battery 2 can be detached and replaced.

Figure 4:
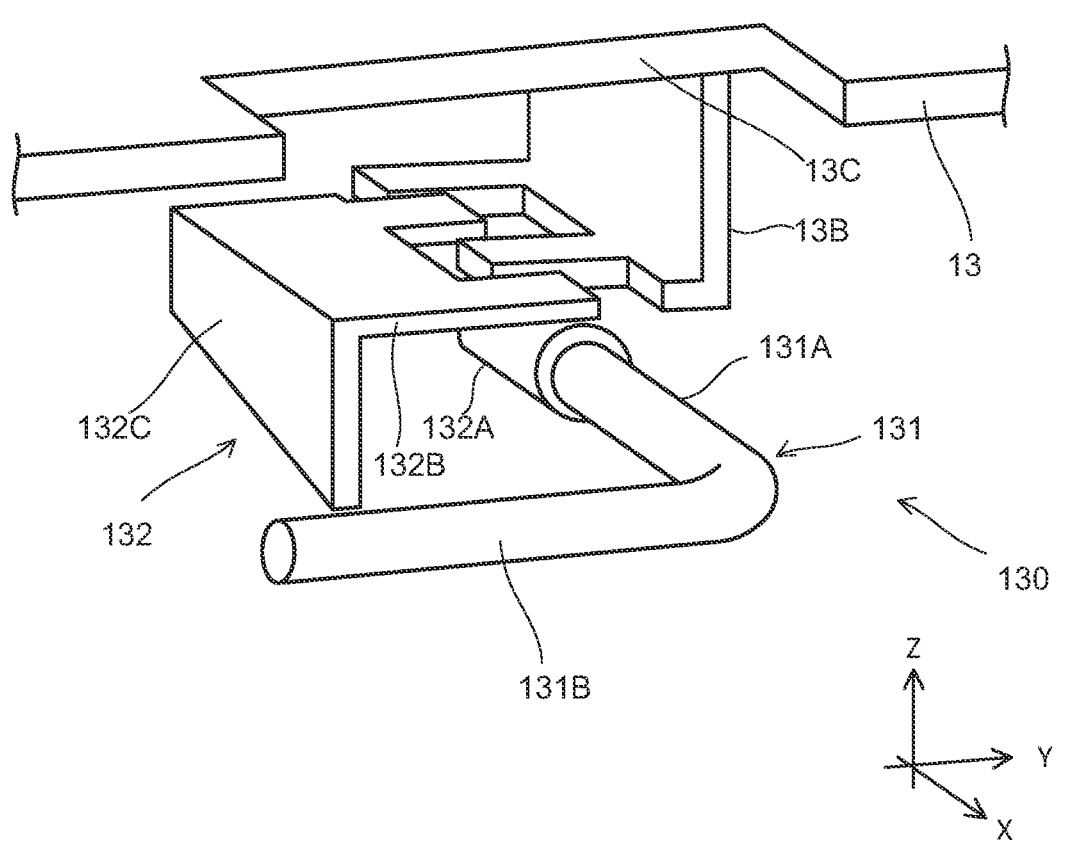
FIG. 4 is a perspective view of a rotation section.

Further, as illustrated in FIG. 4, support portion 13B is disposed on a surface of placement portion 13 on the − side in the Z-direction. Support portion 13B is disposed at a position corresponding to the end portion of placement portion 13 on the + side in the X-direction, and is disposed to protrude from placement portion 13.

Support portion 13B supports rotation section 130 for restricting the movement of battery 2 from the inner position in vehicle 1 to the outer position. Support portion 13B includes, at an end portion on the − side in the Z-direction, two cylindrical portions 13D arranged at an interval in the X-direction, and supports rotation section 130 by cylindrical portions 13D (see FIG. 5A).

Further, placement portion 13 includes, at the end portion on the + side in the X-direction, notch 13C disposed at a position corresponding to support portion 13B.

Figure 5A:
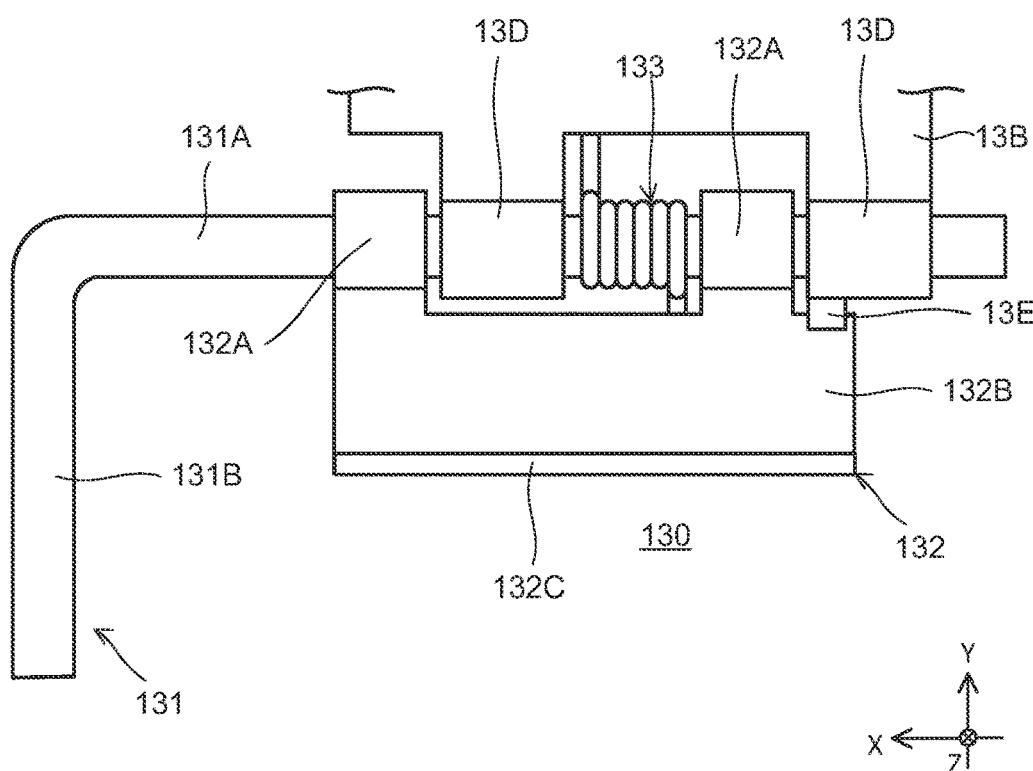
FIG. 5A is a view of the rotation section as seen from the − side in the Z-direction.
Figure 5B:
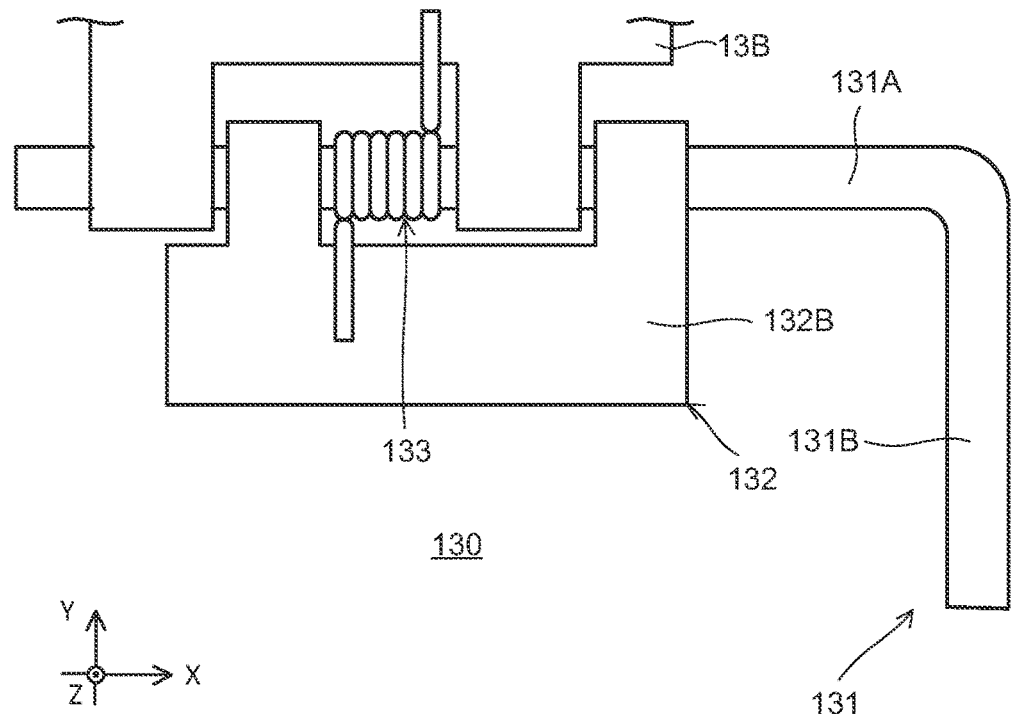
FIG. 5B is a view of the rotation section as seen from the + side in the Z-direction.

As illustrated in FIGS. 5A and 5B, rotation section 130 is disposed at an outer end portion (the end portion on the + side in the X-direction) of placement portion 13, and includes manipulation member 131, rotation member 132, and biasing member 133.

Manipulation member 131 is formed of a rod-shaped pin, and includes supported portion 131A and manipulation portion 131B.

Figure 6A:
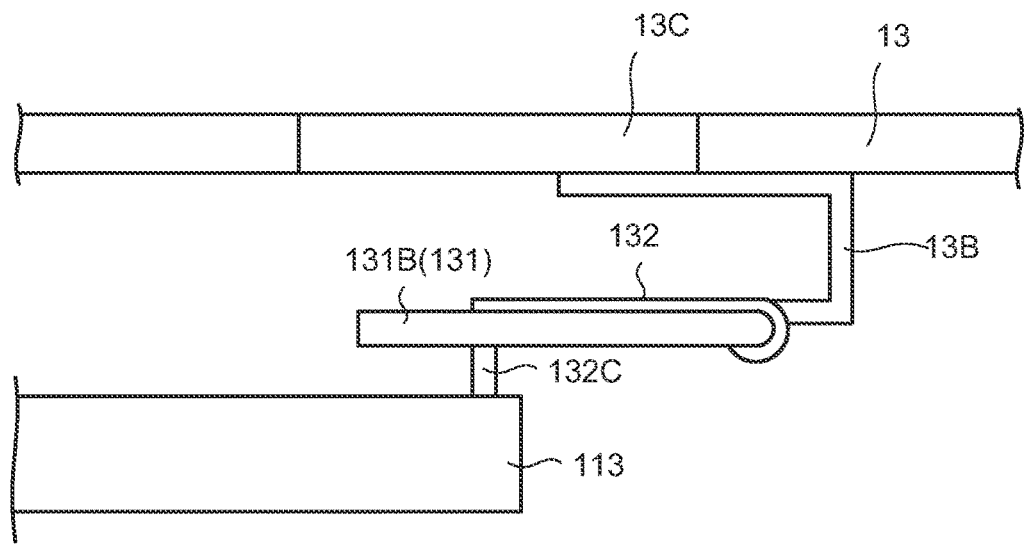
FIG. 6A is a diagram for explaining the rotation of the rotation section.
Figure 6B:
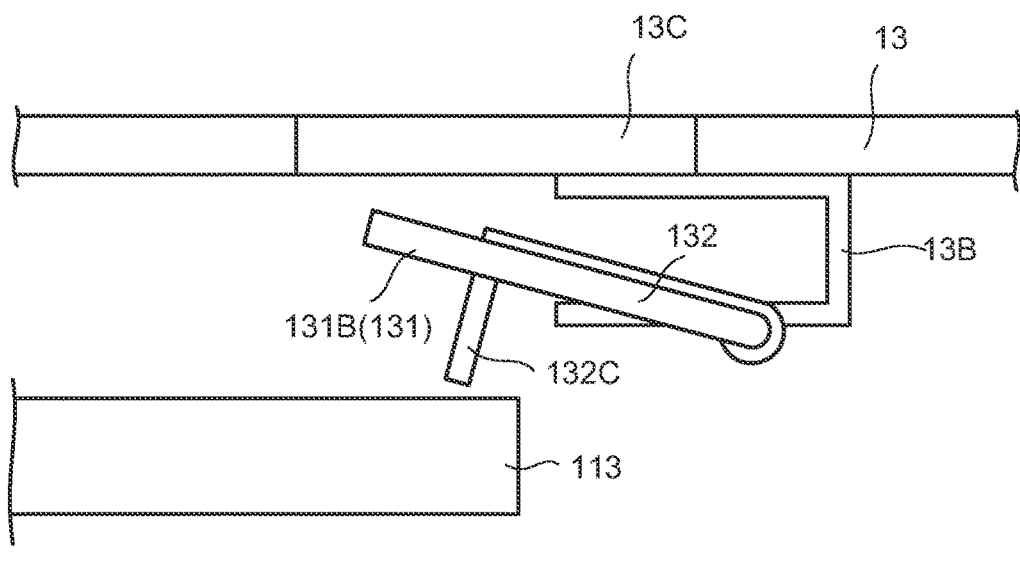
FIG. 6B is a diagram for explaining rotation of the rotation section.

Supported portion 131A is a portion that is supported pivotally by cylindrical portions 13D of support portion 13B of placement portion 13, and is disposed along the X-direction. Supported portion 131A is pivotally supported by cylindrical portions 13D, and accordingly, manipulation member 131 rotates around supported portion 131A as a rotation center (see FIGS. 6A and 6B).

Manipulation portion 131B is for rotary manipulation of rotation section 130 by an operator or a restriction releasing apparatus, and is configured to extend in a direction perpendicular to the X-direction from the end portion of supported portion 131A on the + side in the X-direction. In the example illustrated in FIG. 5A and the like, manipulation portion 131B extends from the end portion on the + side of supported portion 131A in the X-direction toward the − side in the Y-direction.

Manipulation portion 131B is disposed at an outermost position (a position corresponding to the outer end portion of placement portion 13) in rotation section 130, that is, at a position corresponding to above-described notch 13C.

Rotation member 132 is disposed at a position allowing the rotation member to make contact with restriction member 113, and is attached to supported portion 131A of manipulation member 131. Rotation member 132 rotates together with manipulation member 131 as a result of rotary manipulation of manipulation member 131. Rotation member 132 includes attached portion 132A, extending portion 132B, and contact portion 132C.

Attached portion 132A is composed of two claw portions that can be attached to supported portion 131A. The two claw portions are spaced apart from each other in the X-direction, and are attached to supported portion 131A such that the two claw portions and two cylindrical portions 13D of support portion 13B alternate each other. That is, attached portion 132A and support portion 13B constitute a hinge configuration.

Extending portion 132B extends from attached portion 132A toward the − side in the Y-direction, and is formed in a plate shape that is larger than the area in which attached portion 132A is disposed.

In addition, stopper 13E that restricts the rotation of rotation member 132 is disposed on one of two cylindrical portions 13D which is on the − side in the X-direction. Stopper 13E is disposed to protrude from cylindrical portion 13D toward the − side in the Y-direction, and is disposed to be positioned on the − side of extending portion 132B in the Z-direction.

As a result, the rotation of rotation member 132 toward the − side in the Z-direction is restricted when extending portion 132B is disposed along the XY plane.

Contact portion 132C is a portion making contact with restriction member 113, and extends toward the − side in the Z-direction from an end portion of extending portion 132B disposed along the XY plane, the end portion being on the + side in the Y-direction.

Figure 7A:
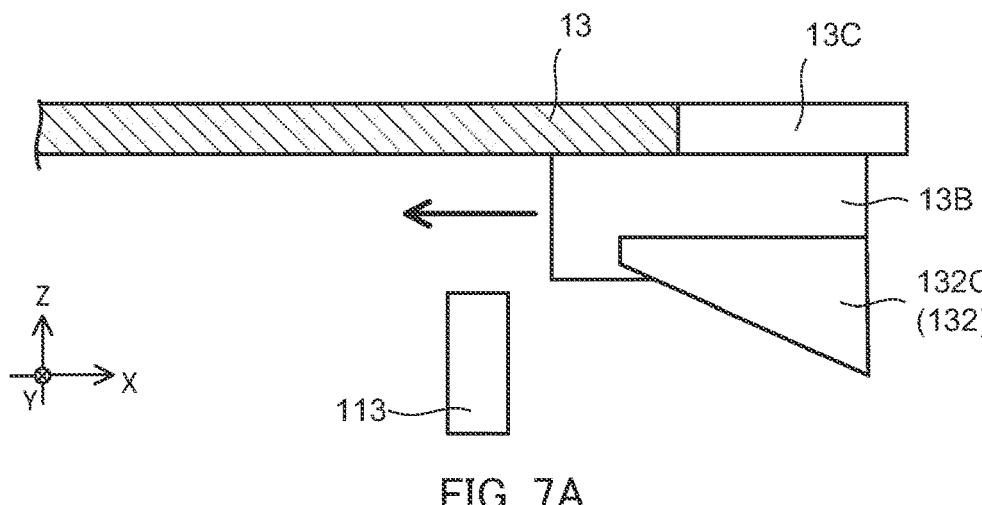
FIG. 7A is a view for explaining the operation of a rotation member performed when moving from the outer position to the inner position.

An end face of contact portion 132C on the − side in the Z-direction is an inclined surface. Specifically, when contact portion 132C is disposed along the Z-direction, the end face of contact portion 132C on the − side in the Z-direction is inclined to be positioned more on the − side in the Z-direction toward the + side in the X-direction (see FIG. 7A).

A portion of the end face of contact portion 132C on the − side in the Z-direction, which is located on the most − side in the X-direction, is located on the + side in the Z-direction with respect to restriction member 113. A portion of the end face of contact portion 132C on the − side in the Z-direction, which is located on the most + side in the X-direction, is located on the − side in the Z-direction with respect to the end face of restriction member 113 on the + side in the Z-direction.

Figure 7B:
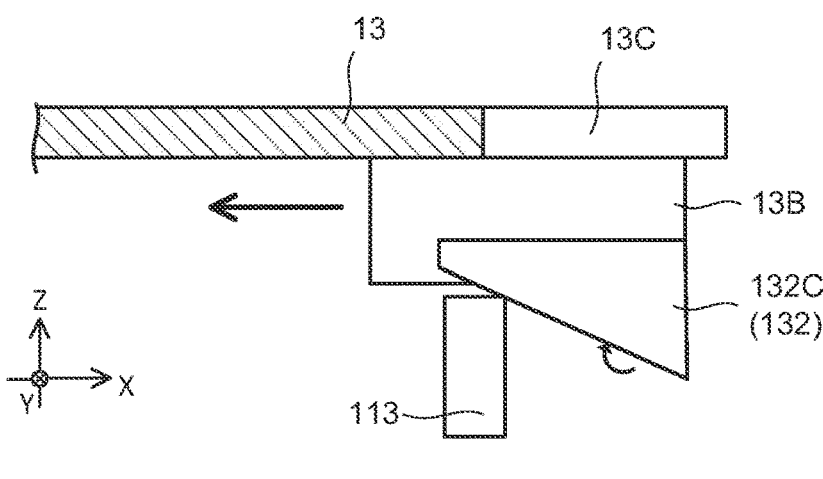
FIG. 7B is a view for explaining the operation of the rotation member performed when moving from the outer position to the inner position.

That is, when contact portion 132C is disposed along the Z-direction, and when placement portion 13 moves from the outer position to the inner position, the contact portion comes into contact with restriction member 113 at the inclined surface (see FIG. 7B).

Further, when contact portion 132C is disposed along the Z-direction, and when placement portion 13 is positioned at the inner position, contact portion 132C comes into contact with restriction member 113 at the end face on the + side in the X-direction.

Biasing member 133 is, for example, a spring member that biases rotation member 132, and is attached to supported portion 131A between the two claw portions of attached portion 132A. Biasing member 133 biases extending portion 132B toward stopper 13E.

As a result, rotation member 132 is disposed such that extending portion 132B extends along the X-direction and contact portion 132C extends along the Z-direction unless an external force is applied. That is, when no external force is applied, rotation member 132 is disposed at a restriction position where the movement of battery 2 is restricted by restriction member 113.

Therefore, when placement portion 13 is positioned at the inner position, rotation member 132 comes into contact with restriction member 113 at the end face of contact portion 132C on the + side in the X-direction, and is thus restricted from moving from the inner position to the outer position.

In addition, when placement portion 13 moves from the outer position to the inner position, rotation member 132 is positioned at a non-restriction position where the movement of battery 2 is not restricted by restriction member 113 since, following the movement of placement portion 13, rotation member 132 comes into contact with restriction member 113 at the inclined surface of contact portion 132C and is thus pushed upward by restriction member 113 to rotate (see FIG. 7B). Consequently, when placement portion 13 moves from the outer position to the inner position, the portion of rotation member 132 can pass the position of restriction member 113.

Figure 7C:
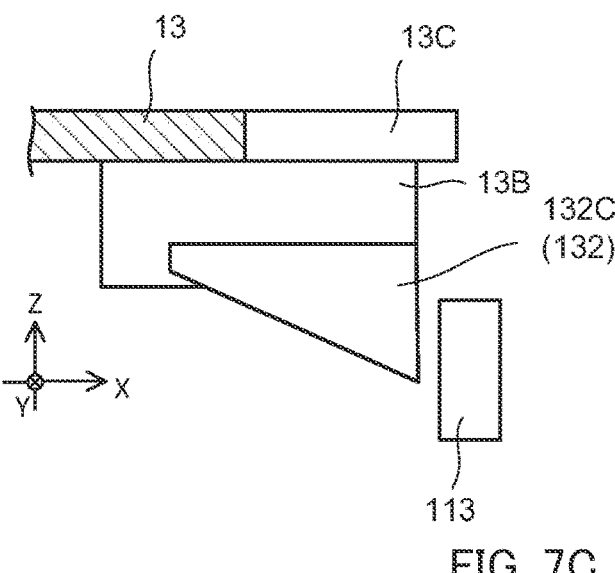
FIG. 7C is a view for explaining the operation of a rotation member performed when moving from the outer position to the inner position.

Further, after rotation member 132 passes the position of restriction member 113, biasing member 133 returns rotation member 132 from the non-restriction position to the restriction position (see FIG. 7C).

Next, restriction releasing apparatus 20 will be described in detail.

As illustrated in FIG. 1, restriction releasing apparatus 20 is an apparatus capable of loading and unloading battery 2 on and off attachment apparatus 10 in order to replace battery 2, and is configured to be capable of releasing the movement restriction on battery 2 by a series of loading and unloading operations of battery 2. Restriction releasing apparatus 20 includes main body portion 21, movement section 22, and release section 23 (see FIG. 8).

Main body portion 21 is a main body portion of restriction releasing apparatus 20 and supports movement section 22 so as to be movable in the Z-direction. For example, main body portion 21 is provided with a manipulation portion manipulatable by an operator, and movement section 22 can be moved in the Z-direction by the operator manipulating the manipulation portion.

Figure 8:
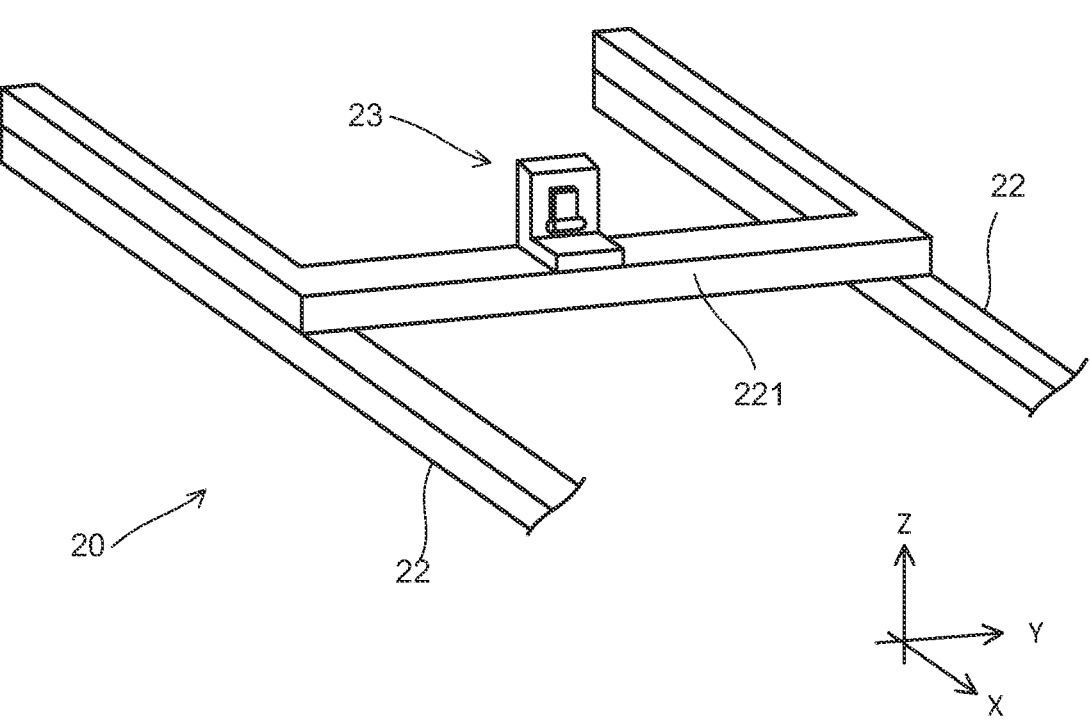
FIG. 8 is a perspective view of the restriction releasing apparatus according to the present embodiment.

As illustrated in FIG. 8, movement section 22 is, for example, a pair of arms extending in the X-direction, and is configured to be movable in the Z-direction. Movement section 22 can move battery 2 in the Z-direction by distal end portions of the arms disposed so as to support, from the − side in the Z-direction, battery 2 placed on placement portion 13 (see FIG. 2).

Further, when battery 2 is disposed on movement section 22, the operator is capable of pulling out battery 2 from the inner position to the outer position via slide portions 12 by moving main body portion 21 toward the + side in the X-direction.

Bridge portion 221 that extends between the pair of arms is disposed at the distal end portions of movement section 22. Bridge portion 221 is disposed at a position corresponding to manipulation member 131 of rotation section 130 when battery 2 is supported by the distal end portions of movement section 22.

Figure 9A:
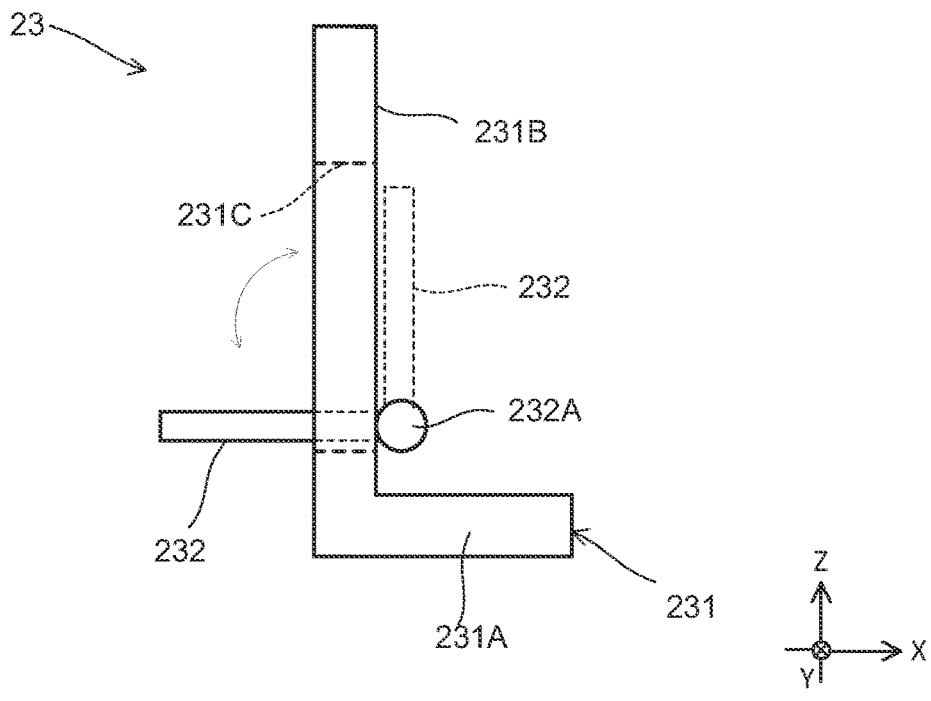
FIG. 9A illustrates a release section as viewed in the Y-direction.
Figure 9B:
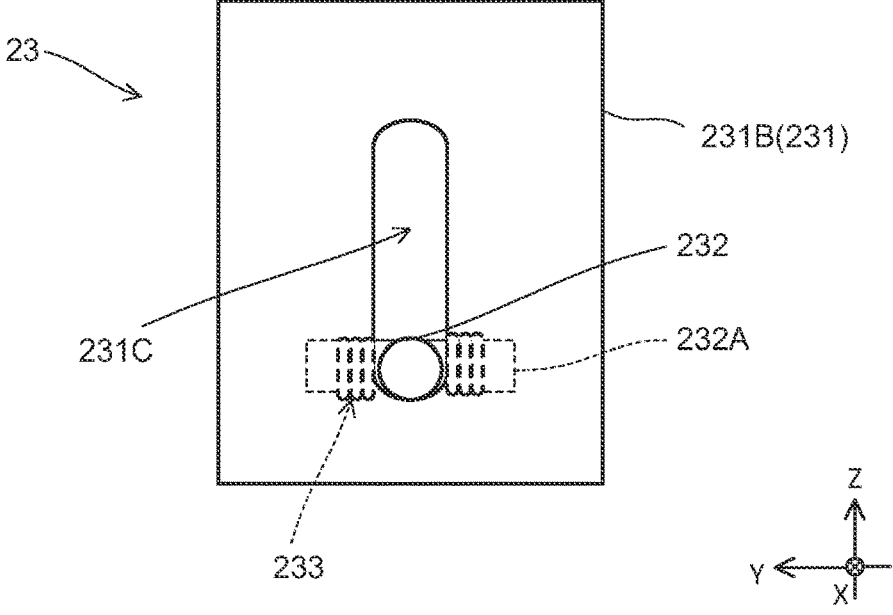
FIG. 9B is a view of the release section as seen in the X-direction.

Release section 23 is a section for releasing the restriction of the movement of battery 2 imposed by restriction member 113 and rotation member 132, and is disposed on bridge portion 221 of movement section 22. As illustrated in FIGS. 9A and 9B, release section 23 includes fixed member 231, pin member 232, and biasing member 233.

Fixed member 231 is a plate-shaped member fixed to bridge portion 221, and includes fixed portion 231A and support portion 231B. Fixed portion 231A is disposed along the XY plane and fixed to bridge portion 221.

Support portion 231B is a portion that supports pin member 232, and is configured to extend toward the + side in the Z-direction from an end portion of fixed portion 231A on the − side in the X-direction. In addition, through-hole 231C is formed in support portion 231B in the vicinity of a portion supporting pin member 232.

Pin member 232 is disposed so as to extend through through-hole 231C in support portion 231B to protrude from support portion 231B toward the − side in the X-direction. Pin member 232 is supported by rotation shaft 232A disposed in the vicinity of an end portion of support portion 231B on the − side in the Z-direction. Specifically, pin member 232 is configured to be rotatable between a first position (a solid-line position in FIG. 9A), which is a position of the pin member disposed along the X-direction, and a second position (a broken-line position in FIG. 9A) closer to fixed member 231 than the first position is to the fixed position. Note that pin member 232 may be a rod-shaped member exemplified in FIG. 9A or the like, or may be a member having any configuration as long as it is rotatable.

The first position is a position for rotating rotation section 130. Pin member 232 at the first position is disposed at a position where a tip end portion of pin member 232 can be brought into contact with manipulation member 131 when battery 2 is supported by movement section 22.

The second position is, for example, a position where pin member 232 is disposed along the Z-direction. Pin member 232 at the second position is located on the + side of fixed member 231 in the X-direction. Through-hole 231C is formed to have a length corresponding to a rotation range of pin member 232 so that pin member 232 can rotate between the first position and the second position.

Biasing member 233 is a spring that biases pin member 232 toward the first position, and is disposed, for example, on a portion of rotation shaft 232A. By biasing member 233, pin member 232 is constantly disposed at the first position.

Next, an operation of restriction releasing apparatus 20 will be described.

When battery 2 is replaced, battery 2 attached to attachment apparatus 10 is pulled out from the inner position in vehicle 1 to the outer position. In this case, the engagement between striker 2A of battery 2 and latch 111A of wall portion 111 of main body portion 11 is first released.

After the engagement between striker 2A and latch 111A is released, the operator sets movement section 22 of restriction releasing apparatus 20 at a position on the − side of placement portion 13 in the Z-direction, and disposes restriction releasing apparatus 20 such that movement section 22 is at a position corresponding to placement portion 13 (see FIGS. 1 and 2).

Then, the operator moves movement section 22 toward the + side in the Z-direction to a position where movement section 22 supports the surface of battery 2 on the − side in the Z-direction. At this time, as illustrated in FIGS. 10A and 10B, pin member 232 pushes manipulation member 131 upward from the − side in the Z-direction.

Figures 10A, 10B:
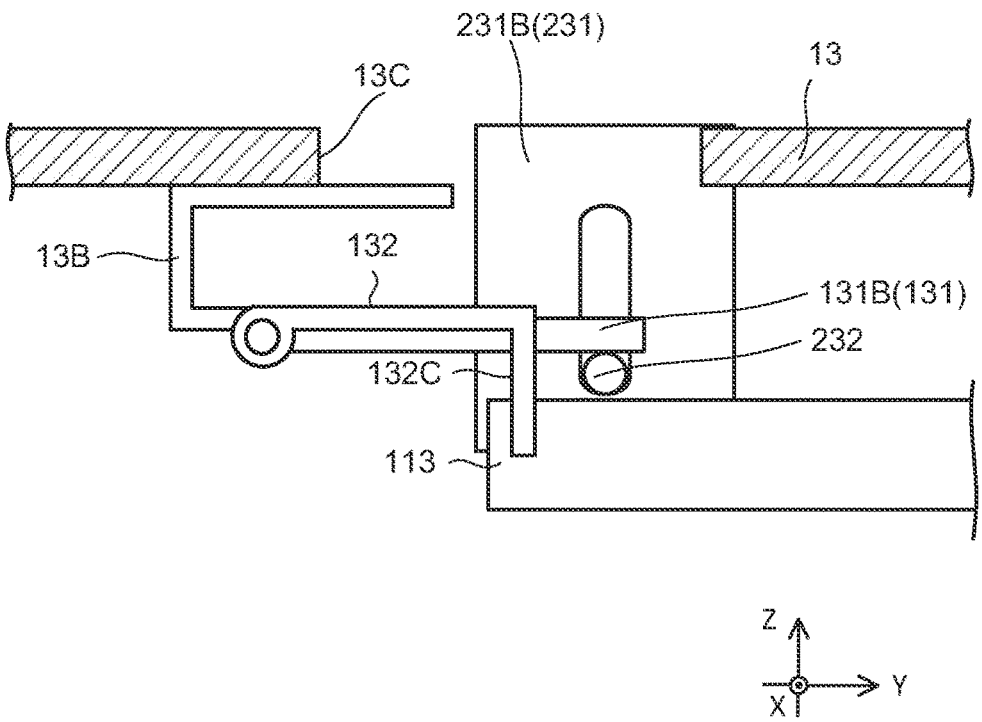
FIG. 10A is a diagram for explaining a release operation of the release section.
FIG. 10B is a diagram for explaining the release operation of the release section.

Specifically, pin member 232 disposed at the position on the − side in the Z-direction with respect to placement portion 13 (see FIG. 10A) moves toward the + side in the Z-direction by the movement of fixed member 231 toward the + side in the Z-direction accompanying the movement of movement section 22, and pushes up manipulation member 131 (see FIG. 10B).

Accordingly, manipulation member 131 is rotated toward the + side in the Z-direction, and thus, the contact between contact portion 132C of rotation member 132C and restriction member 113 is released.

Consequently, the restriction imposed by rotation member 132 and restriction member 113 on the movement of battery 2 from the inner position to the outer position is released, and placement portion 13 can be pulled out via slide portions 12.

Then, by releasing the engagement between latch 13A of placement portion 13 and striker 2B of battery 2, battery 2 can be removed.

Figure 11A:
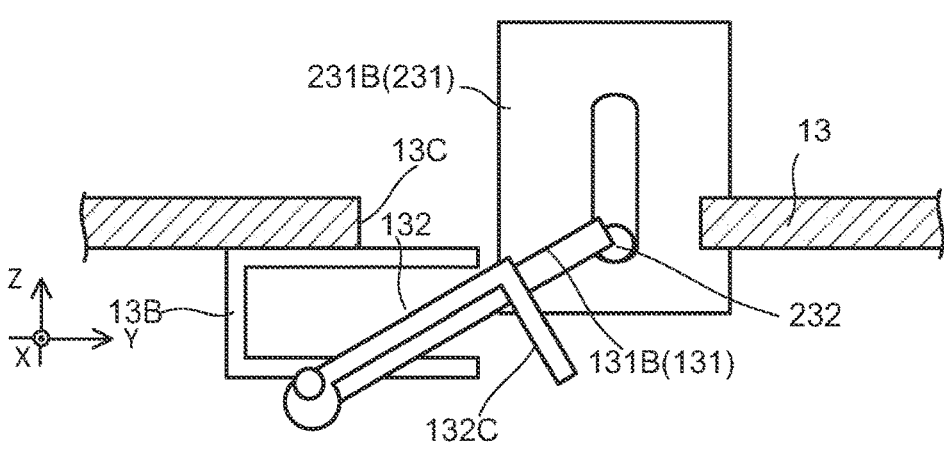
FIG. 11A is a diagram for explaining a behavior of the release section during battery replacement.
Figure 11B:
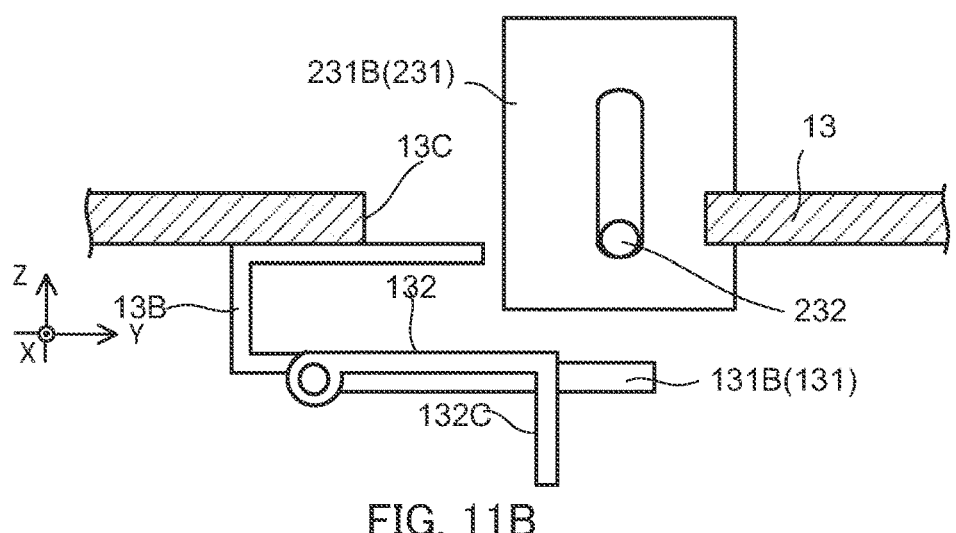
FIG. 11B is a diagram for explaining the behavior of the release section during battery replacement.

Specifically, after placement portion 13 is positioned at the outer position, movement section 22 is moved further toward the + side in the Z-direction, and accordingly, battery 2 is lifted while being supported by movement section 22. At this time, as illustrated in FIG. 11A, pin member 232 moves further toward + side in the Z-direction from the position reached when manipulation member 131 is pushed up. Thus, as illustrated in FIG. 11B, the contact with manipulation member 131 is released, and accordingly, manipulation member 131 and rotation member 132 return to the restriction position by a biasing force of biasing member 133.

Further, since notch 13C is formed in the rotation range of manipulation member 131 of placement portion 13, interference between pin member 232 and placement portion 13 is suppressed.

Then, new battery 2 is placed on movement section 22, and movement section 22 is moved again to the − side in the Z-direction. Accordingly, new battery 2 can be placed on placement portion 13.

Figure 11C:
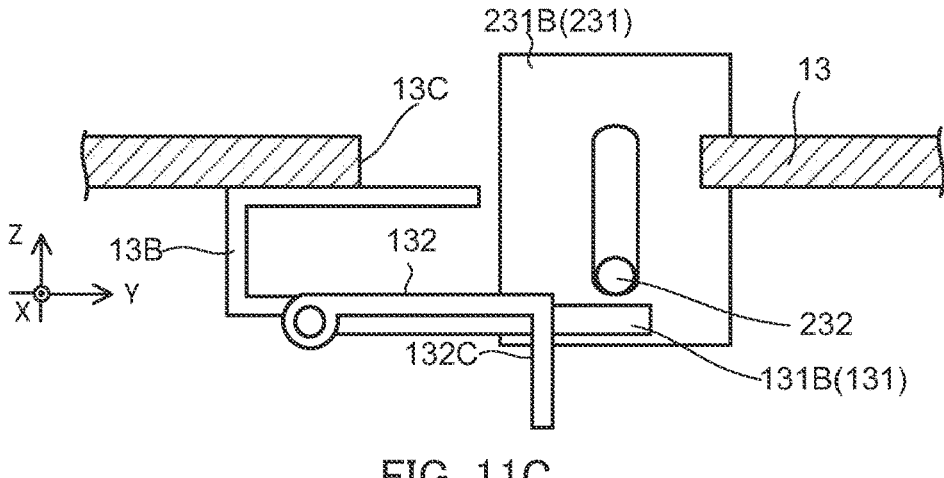
FIG. 11C is a diagram for explaining the behavior of the release section during battery replacement.

At this time, as illustrated in FIG. 11C, movement section 22 moves toward the − side in the Z-direction, and pin member 232 is positioned on the + side in the Z-direction of manipulation member 131 positioned at the restriction position. Accordingly, since rotation member 132 is not maintained at the non-restriction position, the movement of battery 2 to the outer position is restricted by rotation section 130 and restriction member 113 when battery 2 is positioned at the inner position.

After new battery 2 is placed on placement portion 13, the operator pushes restriction releasing apparatus 20 toward the vehicle 1 side. Battery 2 is thus moved from the outer position to the inner position via slide portions 12, and is attached to wall portion 111.

After battery 2 is disposed at the inner position, the operator removes restriction releasing apparatus 20 from battery 2 (attachment apparatus 10). Specifically, the operator moves movement section 22 toward the − side in the Z-direction. Movement section 22 thus moves away from battery 2. Then, it is possible to end the replacement operation of battery 2 by moving restriction releasing apparatus 20 to the side away from vehicle 1.

Figure 12A:
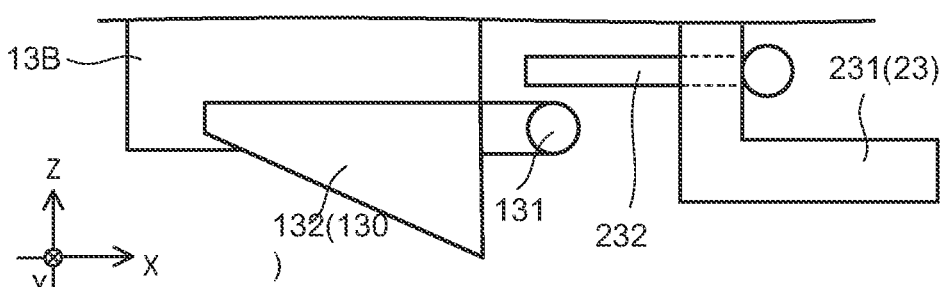
FIG. 12A is a diagram for explaining the behavior of the release section during removal of the restriction releasing apparatus.
Figure 12B:
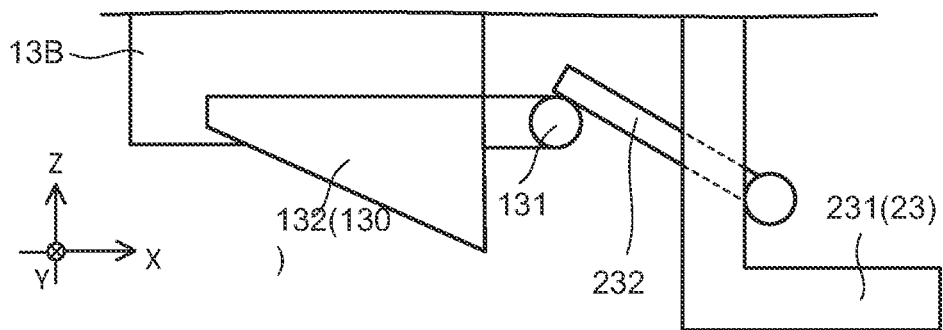
FIG. 12B is a diagram for explaining the behavior of the release section during removal of the restriction releasing apparatus.

Further, as illustrated in FIG. 12A, when movement section 22 moves toward the − side in the Z-direction, pin member 232 makes contact with manipulation member 131 from the + side in the Z-direction. At this time, as illustrated in FIG. 12B, pin member 232 is pushed up from the first position toward the second position by manipulation member 131. Thus, pin member 232 and manipulation member 131 are prevented from interfering with each other and being damaged.

Figure 12C:
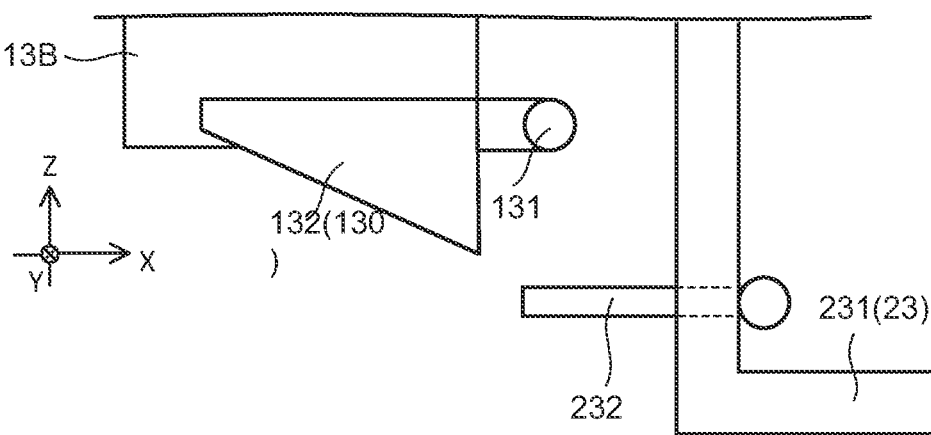
FIG. 12C is a diagram for explaining the behavior of the release section during removal of the restriction releasing apparatus.

Further, when pin member 232 moves toward the – side in the Z-direction as illustrated in FIG. 12C, pin member 232 passes the position corresponding to manipulation member 131, and restriction releasing apparatus 20 is removed from attachment apparatus 10.

According to the present embodiment configured as described above, when the restriction by the restriction apparatus that restricts the movement of battery 2 is released by using rotation section 130, fixed member 231 (support portion 231B) is moved toward rotation section 130 via movement section 22. That is, when support portion 231B moves in the rotation direction (the + side in the Z-direction) of rotation section 130, release section 23 rotates rotation section 130 from the restriction position to the non-restriction position.

Accordingly, the restriction by rotation section 130 can be released during the unloading operation for unloading battery 2 by restriction releasing apparatus 20. That is, in the present embodiment, the restriction by the restriction apparatus including rotation section 130 can be easily released.

In addition, since the restriction by the restriction apparatus can be released by pin member 232 that rotates rotation section 130 by making contact with rotation section 130, a simple configuration can be achieved.

Further, since pin member 232 rotates between the first position and the second position, pin member 232 can be allowed to pass manipulation member 131 when manipulation member 131 and pin member 232 interfere with each other, for example, when restriction releasing apparatus 20 is removed. Consequently, it is possible to prevent manipulation member 131 and pin member 232 from being damaged due to interference.

Further, since biasing member 233 biases pin member 232 to the first position, the position of pin member 232 is maintained in the first position unless any external force is applied. As a result, when rotation section 130 is to be rotated, pin member 232 can be reliably set to the first position.

Further, since through-hole 232C is formed in support portion 231B of fixed member 231 at a position corresponding to the rotation range of pin member 232 between the first position and the second position, it is possible to suppress pin member 232 from interfering with fixed member 231 when pin member 232 is rotated.

In the above-described embodiment, pin member 232 is configured to be rotatable, but the present disclosure is not limited thereto, and the pin member does not have to be rotatable. In this case, a configuration may be adopted in which a change in the positional relation between the pin member and the manipulation member as illustrated in FIGS. 11A to 11C does not occur.

Further, in the above embodiment, pin member 232 is biased toward the first position by biasing member 233, but the present disclosure is not limited thereto, and the biasing member does not have to be provided. In this case, the pin member may be positioned at the first position by its own weight or the like.

Further, in the above-described embodiment, through-hole 231C is provided in the rotation range of pin member 232, but the present disclosure is not limited thereto, and the through-hole does not have to be provided.

Further, by way of example, the present disclosure is applied to the restriction apparatus including the rotation section illustrated in FIG. 4 or the like in the above-described embodiment, but the present disclosure is not limited thereto, and may be applied to a restriction apparatus including other rotation sections.

The embodiments above are no more than specific examples in carrying out the present disclosure, and the technical scope of the present disclosure is not to be construed in a limitative sense due to the specific examples. That is, the present disclosure can be implemented in various forms without departing from its spirit or key features.

INDUSTRIAL APPLICABILITY

The restriction releasing apparatus of the present disclosure is useful as a restriction releasing apparatus capable of easily releasing the restriction by the restriction apparatus.

The invention claimed is:

1. A restriction releasing apparatus that releases restriction imposed by a restriction apparatus that restricts movement of a battery from an inner position in a vehicle to an outer position by using a rotation section that rotates between a restriction position and a non-restriction position, the restriction releasing apparatus being configured to enable loading and unloading the battery, and the restriction releasing apparatus comprising:
   a movement section movable toward the rotation section positioned at the restriction position, and capable of moving the battery while supporting the battery; and
   a release section supported by the movement section, wherein
   the release section rotates the rotation section from the restriction position to the non-restriction position.

2. The restriction releasing apparatus according to claim 1, wherein
   the release section includes a pin member for rotating the rotation section by making contact with the rotation section.

3. The restriction releasing apparatus according to claim 2, wherein:
   the pin member is rotatable between a first position and a second position, the first position being where the pin member is in contact with the rotation section, the second position being where a direction of a tip end of the pin member in the second position is different from the direction of the tip end in the first position, and
   the release section includes a biasing member for biasing the pin member from the second position toward the first position.

4. The restriction releasing apparatus according to claim 3, wherein
   the release section includes a through-hole formed at a position corresponding to a rotation range of the pin member configured to rotate between the first position and the second position.

* * * * *